United States Patent
Hirve et al.

(10) Patent No.: US 7,976,039 B2
(45) Date of Patent: Jul. 12, 2011

(54) UPPER SUPPORT APPARATUS FOR A VEHICLE SUSPENSION

(75) Inventors: Ajay M. Hirve, Canton, MI (US); Mikhal el Arculli, Canton, MI (US)

(73) Assignee: Toyota Motor Engineering & Manufacturing North America, Inc., Ann Arbor, MI (US)

( * ) Notice: Subject to any disclaimer, the term of this patent is extended or adjusted under 35 U.S.C. 154(b) by 5 days.

(21) Appl. No.: 12/545,269

(22) Filed: Aug. 21, 2009

(65) Prior Publication Data
US 2011/0042914 A1   Feb. 24, 2011

(51) Int. Cl.
*B60G 15/00* (2006.01)

(52) U.S. Cl. ... 280/124.145; 280/124.146; 280/124.147; 280/124.151

(58) Field of Classification Search ........... 280/124.145, 280/124.146, 124.147, 124.151
See application file for complete search history.

(56) References Cited

U.S. PATENT DOCUMENTS

| | | | |
|---|---|---|---|
| 4,465,296 A | | 8/1984 | Shiratori et al. |
| 4,477,061 A | | 10/1984 | Kawaura et al. |
| 4,486,028 A | | 12/1984 | Tanahashi |
| 4,874,185 A | * | 10/1989 | Kijima et al. .......... 280/124.139 |
| 5,454,585 A | * | 10/1995 | Dronen et al. .......... 280/124.145 |
| 5,467,971 A | * | 11/1995 | Hurtubise et al. ............ 267/220 |
| 6,412,798 B2 | * | 7/2002 | De Fontenay et al. . 280/124.147 |
| 6,427,814 B1 | * | 8/2002 | Miyamoto ............... 188/321.11 |
| 6,588,780 B2 | | 7/2003 | Hayashi et al. |
| 6,616,160 B2 | * | 9/2003 | Tadano ................... 280/124.147 |
| 7,644,935 B2 | * | 1/2010 | Munster et al. ............ 280/5.514 |
| 2001/0026057 A1 | | 10/2001 | Hayashi et al. |
| 2005/0247531 A1 | * | 11/2005 | Oota ......................... 188/322.19 |
| 2006/0175787 A1 | * | 8/2006 | Munster et al. ........ 280/124.145 |
| 2007/0210539 A1 | * | 9/2007 | Hakui et al. ................ 280/5.514 |

* cited by examiner

Primary Examiner — Toan To
(74) Attorney, Agent, or Firm — Garrana Tran LLP; Andrea E. Tran

(57) ABSTRACT

An upper support apparatus for use in a suspension system of a vehicle is disclosed, wherein the apparatus includes an upper support plate defining at least one aperture, the upper support plate coupled to a body of the vehicle. The upper support apparatus further includes a resilient member coupled to an underside of the upper support plate, wherein at least one portion of the resilient member is adapted to protrude through the at least one aperture and wherein the at least one portion of the resilient member prevents direct contact between the upper support plate and the body of the vehicle.

20 Claims, 4 Drawing Sheets

UPPER SUPPORT APPARATUS FOR A VEHICLE SUSPENSION

TECHNICAL FIELD

The present disclosure relates generally to the field of vehicle suspension systems, and more particularly, to upper support apparatus for use with vehicle suspension systems.

BACKGROUND

In a conventional motor vehicle wheel suspension system, a shock absorber comprising a piston rod and a cylinder, and a coil spring may be provided. The shock absorber may be secured, at one end of its piston rod, to a part of the vehicle body via a strut mounting, which may also be referred to as an upper support. On the other end, the shock absorber may be coupled, at its cylinder portion, to a wheel axle of the vehicle. Additionally, the coil spring may be disposed around the shock absorber and may be generally located between an upper spring seat carried by the upper support and a lower spring seat carried by the cylinder. The shock absorber and the coil spring may together function to cushion the vehicle body from an oscillating energy from the road surface, received by the wheel, and therefore wheel axle, thereby preventing the vibrations from being transferred to the vehicle body.

The portion of the upper support coupled to the vehicle body may be referred to as the upper support plate. The upper support plate may conventionally be composed of a metal or metal alloy such as steel. Occasionally, due to vibrations received by the wheel, the upper support plate may have slight relative motion to the vehicle body, which may also be composed of a metal. Such intermittent contact may produce undesirable affects such as discomfort and/or bothersome noise to drivers and passengers of the vehicle.

Thus, a need exists for apparatus to prevent intermittent contact between the upper support plate and the vehicle body in order to reduce undesirable effects from vibrations received by the wheel of the vehicle.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the present disclosure provides for an upper support apparatus for use in a suspension system of a vehicle, wherein the apparatus includes an upper support plate defining at least one aperture, the upper support plate coupled to a body of the vehicle. The upper support apparatus further includes a resilient member coupled to an underside of the upper support plate, wherein at least one portion of the resilient member is adapted to protrude through the at least one aperture and wherein the at least one portion of the resilient member prevents direct contact between the upper support plate and the body of the vehicle.

Another aspect of the present disclosure provides for an apparatus for coupling a shock absorber to a vehicle body, wherein the apparatus includes an upper support plate defining a plurality of apertures. The upper support plate defines a plurality of apertures, wherein the upper support plate is coupled to a body of the vehicle. Further, the apparatus includes a resilient member coupled to the upper support plate, the resilient member disposed substantially beneath the upper support plate, wherein the resilient member is adapted to protrude through the plurality of apertures to isolate the upper support plate from the vehicle body. The apparatus further includes a shock absorber comprising a piston rod, the piston rod coupled to an underside of the upper support plate.

Yet another aspect of the present disclosure provides a vehicle suspension system including a vehicle body and an upper support plate defining at least one aperture, the upper support plate coupled to the vehicle body. The vehicle suspension system includes a resilient member coupled to an underside of the upper support plate, wherein at least one portion of the resilient member is adapted to protrude through the at least one aperture and wherein the at least one portion of the resilient member prevents direct contact between the upper support plate and the vehicle body.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
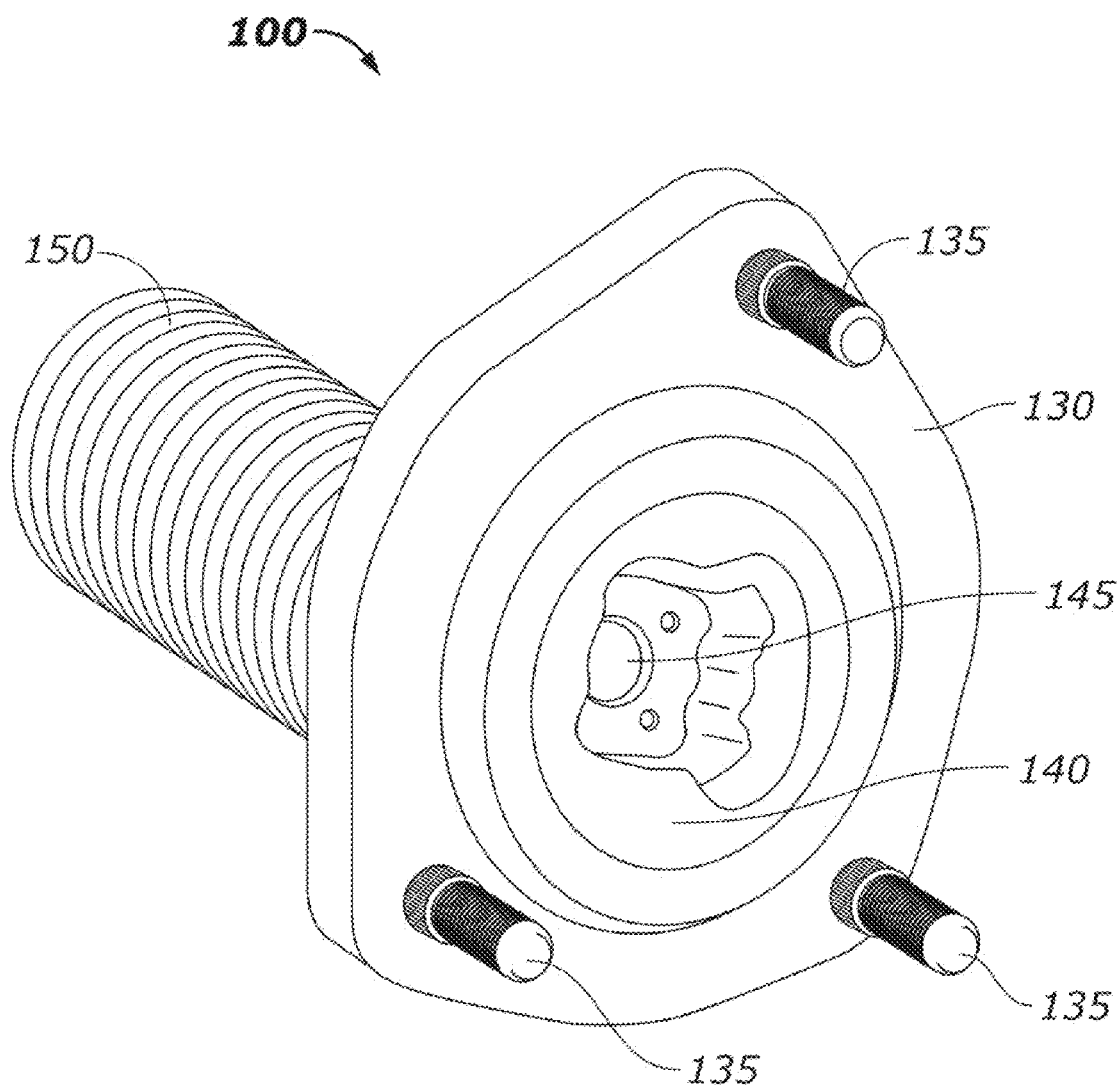
FIG. 1 represents a upper support in accordance with one aspect of the present disclosure.

Before the present apparatus are described, it is to be understood that this disclosure is not limited to the particular apparatus described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "an," and "the" may include plural referents unless the context clearly dictates otherwise. Thus, for example, reference to "an aperture" refers to one or several apertures.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

FIG. 1 represents an upper support 100 as is generally known in the art. The upper support 100 may be part of a vehicle suspension system (not pictured) and may be coupled to a vehicle body (not pictured). In general, a suspension system may refer to the components of a vehicle that couples the vehicle body to a set of wheels. To this end, suspension systems may affect the vehicle's handling and braking to provide for driving pleasure and safety. Furthermore, suspension systems may attempt to keep vehicle occupants comfortable and reasonably well isolated from road noise, bumps, and vibrations.

The upper support 100 may be used to couple various components from the vehicle wheels to the vehicle body. Such components may be generally directed towards preventing the aforementioned vibrations from being transmitted to the vehicle body. As such, the upper support 100 may include an upper support plate 130 at a first end, which may provide an interface to couple the upper support 100 to the vehicle body. The upper support plate 130 may provide a surface to be coupled to the vehicle body. For example, in one implementation, the upper support plate 130 may be coupled to the vehicle body via a bolt 135. It should be noted that the present disclosure is not limited to securing the upper support 100 to the vehicle body with bolts and that other methods of coupling the upper support plate 130 to the vehicle body are also contemplated.

The upper support plate 130 may further include an inner surface (i.e., underside), which may also include a cavity 145 used to secure a shock absorber as part of a fully assembled strut, further described below and shown in subsequent figures. The inner surface or underside of the upper support plate is the surface proximate to the resilient member 150.

Typically, the upper support plate 130 may be composed of any metal or metal alloy, such as steel for example. Because the upper support plate 130 may be made from a metal, contact between the upper support plate 130 and the vehicle body, which may occasionally occur as a result of vibrations received by the vehicle wheels, may produce undesirable noise audible to the driver and/or passenger(s). Consequently, the upper support plate 130 of the present disclosure may be configured with certain characteristics to reduce such unwanted noises. These characteristics will be described in further detail beginning with reference to FIG. 3.

Additionally, the upper support 100 may include a resilient member 150 coupled to the underside of the upper support plate 130. The resilient member 150 may generally be used to absorb other vibrations (e.g., relatively smaller, residual vibrations) not absorbed by other components of the suspension system such as a shock absorber or coil spring, for example.

Figure 2:
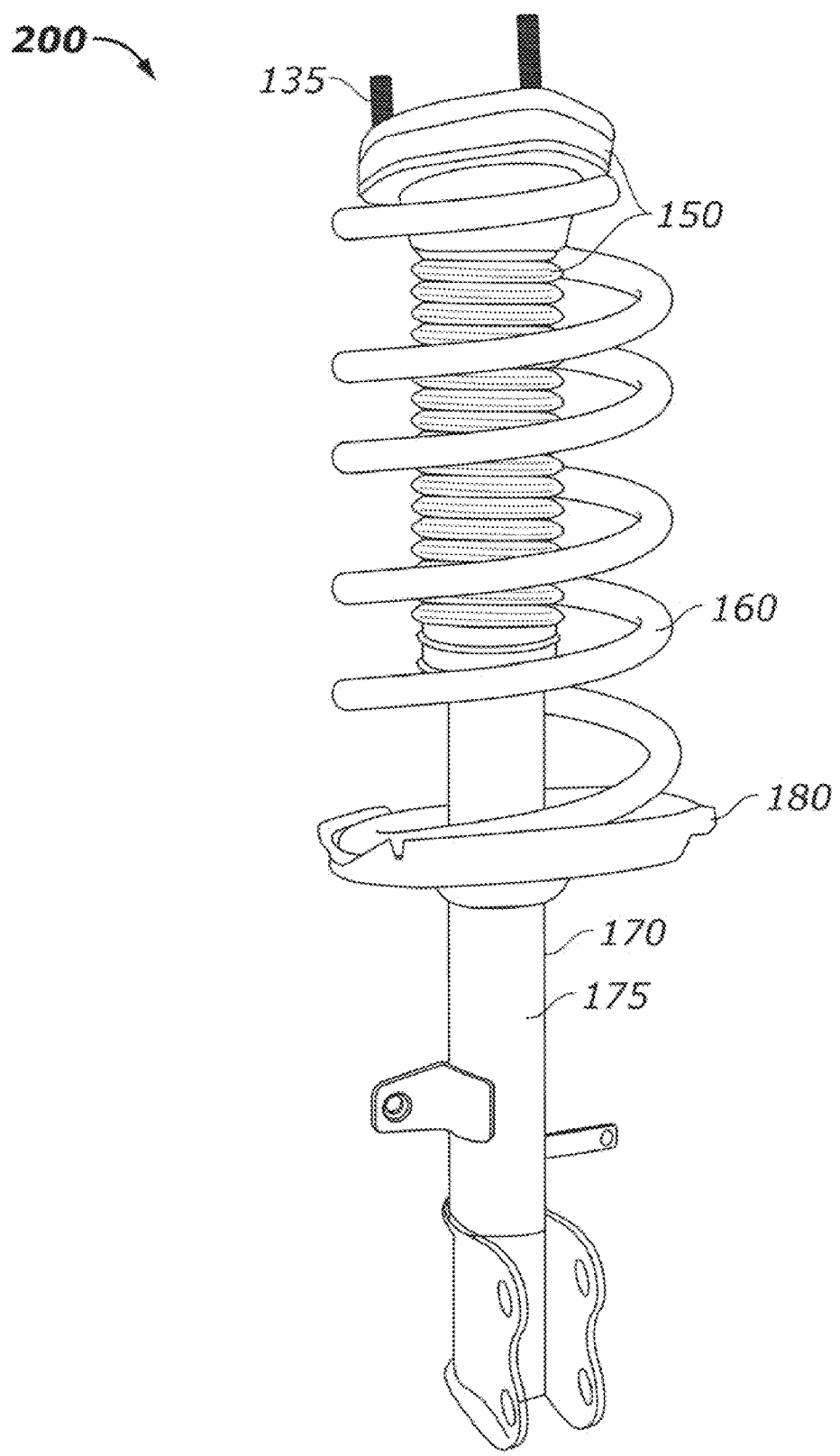
FIG. 2 represents a side view of the upper support of FIG. 1 as part of a fully assembled strut.

FIG. 2 depicts the upper support 100 of FIG. 1 as part of a fully assembled strut 200 for a vehicle suspension system. In addition to the upper support 100, the strut 200 may include a shock absorber 170 coupled to the upper support 100.

As previously mentioned, the shock absorber 170 may be coupled to the upper support 100 at a cavity within the inner surface (i.e., underside) of the upper support plate 130. The shock absorber itself may be well known in the art and may include cylinder 175 and a piston rod (not pictured) slidably disposed within the cylinder. As such, the piston rod of the shock absorber 170 may be secured to the inner surface of the upper support plate 130.

Moreover, the shock absorber 170 may typically be accompanied by a coiled member 160 surrounding the shock absorber 170. To this end, the coiled member 160 may be secured by a spring seat 180 coupled to the cylinder 175 of the shock absorber 170. Together, the shock absorber 170 and the coiled member 160 may provide vibration damping or reduction for relatively large oscillatory forces. As such, the coiled member 160 may comprise any suitable resilient material and may be a spring, for example. In the event that a vehicle encounters a bump in the road, vibrations may be produced in the vehicle. The shock absorber 170 and coiled member 160 may be configured to be deformable and absorb such vibrations so that the impact of the vibrations on the vehicle body and accompanying noises may be significantly reduced or eliminated as perceived by the driver and/or passengers of the vehicle.

As mentioned above, the upper support 100 may also include a resilient member 150 coupled to the underside of the upper support plate 130. In one implementation, the resilient member 150 may be bonded to the upper support plate 130 via an ordinary vulcanization process. Additionally, the resilient member 150 may be disposed to surround the piston rod of the shock absorber 170 but also within the circumference of the coiled member 160. In one implementation, the resilient member 150 may be composed of rubber, but any other material that allows for some deformation and/or resiliency is also contemplated within the present disclosure. Moreover, the resilient member 150 may be configured to absorb relatively small oscillating energies that have not been absorbed by the shock absorber 120 and/or coiled member 160.

Typically, the resilient member 150 may be associated with non-linear spring characteristics for maintaining driving comfort. For example, the resilient member 150 may exhibit soft spring characteristics during application of relatively low oscillatory movements. At the same time, the resilient member 150 may also exhibit hard spring characteristics, which means that the resilient member may not be deformed to a large extent, upon application of relatively high oscillatory movements.

Therefore, in addition to providing suspension for vehicles, the upper support may be used to couple a shock absorber 170 to a vehicle body and a vehicle wheel. To this end, the upper support 100 of the vehicle suspension system may be constructed to transmit forces from the shock absorber 170 and coiled member 160 to the vehicle body via the resilient member 150. Thus, the upper support 100 may provide vibration dampening to vibrations that occur as a result of encountering various obstacles while driving. While the shock absorber 170 and coiled member 160 may be employed to provide much of the vibration damping resulting from vibrations received by the wheels, any residual vibrations may be reduced by the resilient member 150.

Figure 3:
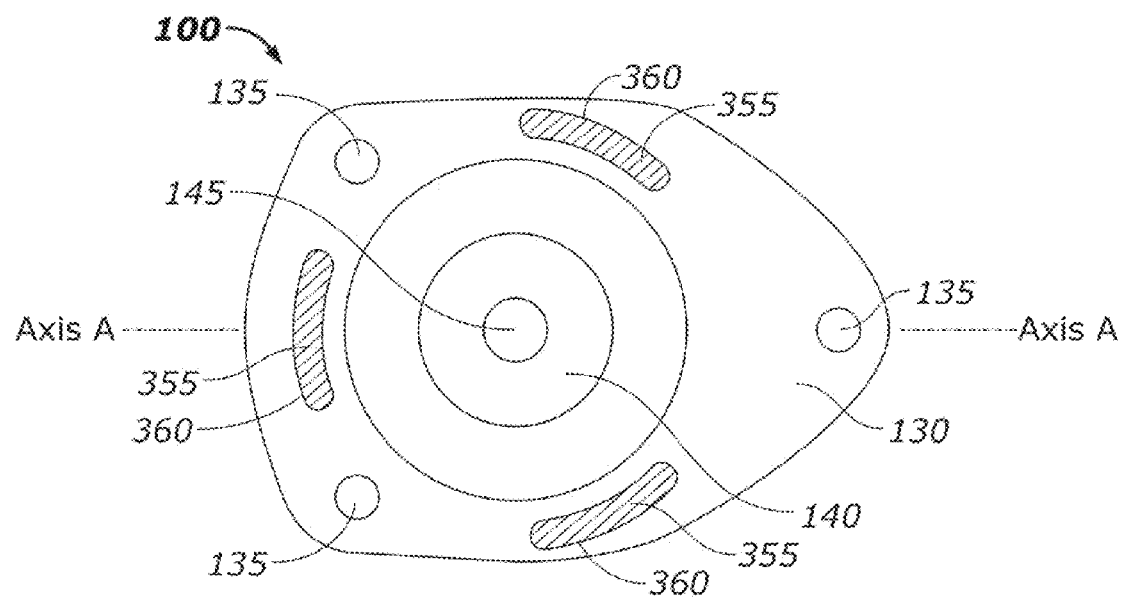
FIG. 3 represents a top plan view of the upper support of FIG. 1.

FIG. 3 represents a top plan view of an upper support 100 in accordance with one aspect of the present disclosure. The upper support 100 of FIG. 3 may also include an upper support plate 130. Likewise, the upper support plate 130 may be secured to a vehicle body via bolts 135. Additionally, the upper support plate 130 may also include an inner surface which may include a cavity 145 for coupling a shock absorber.

As previously mentioned, the upper support plate 130 may typically be composed of metal or a metal alloy. In order to prevent metal to metal contact between the upper support plate 130 and the vehicle body that may occur due to vibrations, the upper support plate 130 may define one or more apertures 360. While FIG. 3 illustrates the upper support plate 130 as defining three generally oval shaped apertures 360, it should be noted that the apertures 360 may be of any shape or size and may be of any quantity. Additionally, the upper support 100 may include a resilient member (not pictured in FIG. 3) coupled to the underside of the upper support plate 130.

As such, certain portions 355 of the resilient member may be configured to protrude through the apertures 360 such that the portions 355 may be elevated above the upper support plate 130. Thus, vibrations that would typically cause the metal surface of the upper support plate 130 to contact the vehicle body may now be prevented by the portions 355 of the resilient member. In effect, the portions 355 of the resilient member may serve to isolate the vehicle body from the upper support plate 130. Notably, contact between the portion 355 of the resilient member and the vehicle body may produce a relatively quieter and less intrusive sound. As a result, noises that occur from contact between the metal surface of the upper support plate 130 and the vehicle body may be prevented, and passengers may be able to enjoy a more comfortable ride. Furthermore, it should also be noted that the portions 355 of the resilient member that protrude through the apertures 360 may take on any shape through the apertures 360 and are not limited to the generally oval shape depicted in FIG. 3.

Moreover, in order to fit the portions 355 of the resilient member through the apertures 360, a variety of techniques may be employed. In one implementation, the upper support plate 130 may be pressed onto the resilient member with enough force such that the portions 355 of the resilient member protrude through the apertures 360. In another implementation, the portions 355 of the resilient member may first be molded into a predetermined shape such that the portions 355 may fit through the apertures 360. Furthermore, it should be noted that configuring the resilient member to protrude through the apertures 360 is not limited to these methods, and any other methods are also contemplated within the present disclosure.

Figure 4:
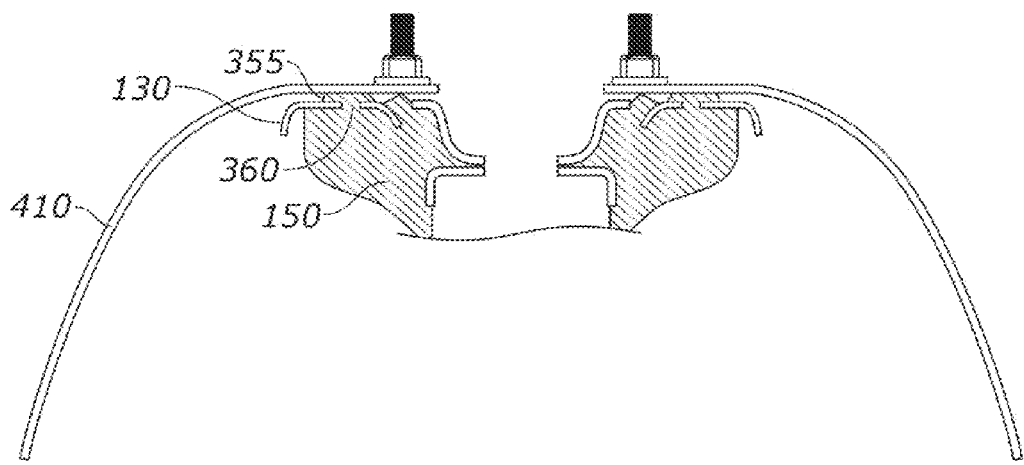
FIG. 4 represents a cross-sectional view of the upper support in FIG. 1.

Turning now to FIG. 4, a cross-sectional view of the upper support 100 along axis A of FIG. 3 is provided. As depicted, a substantial section of the resilient member 150 may be disposed and/or coupled to the underside of the upper support plate 130. In addition, a portion 355 of the resilient member 150 may also be configured to protrude through the aperture 360. To this end, the portion 355 of the resilient member 150 may enable the isolation of the vehicle body 410 from the upper support plate 130. In this manner, the metal to metal contact between the vehicle body 410 and the upper support plate 130 may be prevented, and the vibrations and/or noise resulting from such contact may be significantly reduced or even eliminated.

Figure 5:
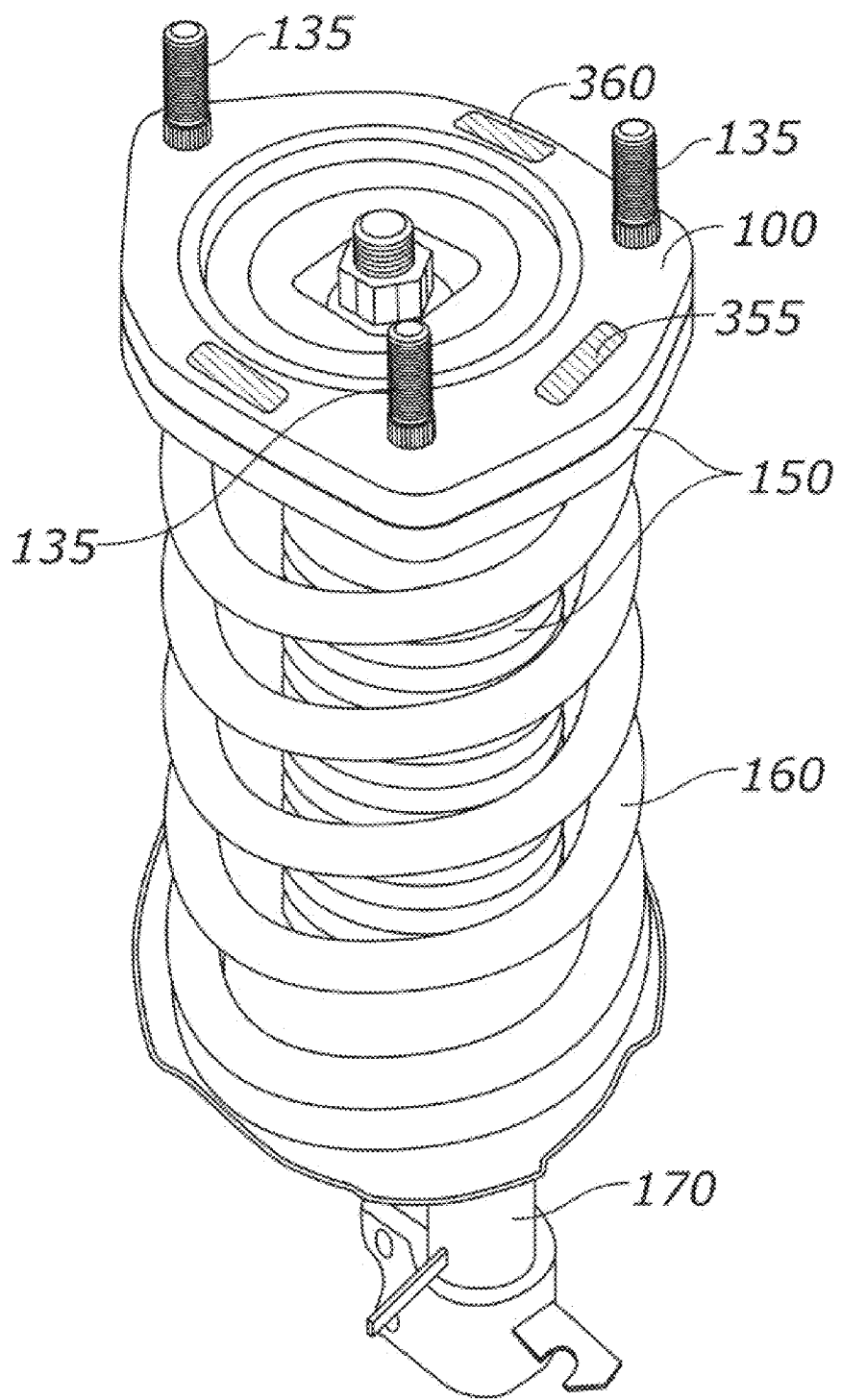
FIG. 5 represents an angled side view of the assembled strut of FIG. 2.

FIG. 5 represents an angled side view of the upper support 100 of FIG. 2 as part of a fully assembled strut 200 for use in a vehicle suspension system. Similar to the fully assembled strut 200 depicted in FIG. 2, the strut 200 in FIG. 5 may include a shock absorber 170 coupled to the upper support 100. Furthermore, the strut 200 may also include a coiled member 160 disposed to surround the resilient member 150. However, the strut 200 may also be configured such that portions 355 of the resilient member 150 protrude through apertures 360 in the upper support plate 130. To this end, the portion 355 and resilient member 150 must first be molded into one piece of material (e.g., rubber). Then, the one piece of material can be pressed onto the upper support plate 130, such that the portion 355 will be forced through aperture 360 during the pressing of the one piece of material.

In another implementation, a portion 355 and resilient member 150 are molded with the upper support plate 130 inside the mold. To this end, an upper support plate 130 is put into a mold as a molding operation is initiated. An elastic material, such as rubber, for example, is flowed into the mold, taking the shape of the mold. An end product results as the portion 355 and resilient member 150 are formed as the rubber flows through the mold and through the aperture 360 to create one piece of material. As mentioned above, the portions 355, resilient member 150, and/or piece of material may ensure isolation of the upper support plate 130 from the vehicle body to reduce unwanted noise. Other suitable methods of manufacturing an elastic material to protrude through the upper support plate are contemplated by the present disclosure. Thus, an upper support apparatus is provided for coupling a shock absorber to a vehicle body in a vehicle suspension system. The apparatus includes an upper support which comprises an upper support plate. Because the upper support plate may be composed of metal, contact between the upper support plate and the vehicle body may produce undesirable vibrations and/or noise. Thus, the upper support plate may define one or more apertures through which portions of a resilient member may protrude, thereby preventing direct contact between the upper support plate and the vehicle body.

It should be noted that the apparatus described in the present disclosure may be employed in either front or rear vehicle suspension systems. Furthermore, although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An upper support apparatus for use in a suspension system of a vehicle, the apparatus comprising:
    an upper support plate defining at least one aperture, the upper support plate coupled to a body of the vehicle; and
    a resilient member coupled to an underside of the upper support plate, wherein at least one portion of the resilient member is adapted to protrude through the at least one aperture and wherein the at least one portion of the resilient member prevents direct contact between the upper support plate and the body of the vehicle.

2. The apparatus of claim 1, wherein the resilient member comprises rubber.

3. The apparatus of claim 1 further comprising a shock absorber coupled to the upper support plate, the shock absorber comprising a cylinder and a piston rod slidably disposed within the cylinder.

4. The apparatus of claim 3, wherein the resilient member is disposed to surround the piston rod.

5. The apparatus of claim 1 further comprising a coiled member disposed to surround the resilient member, the coiled member adapted to dampen vibrations in the body of the vehicle.

6. The apparatus of claim 1, wherein the upper support plate comprises metal.

7. The apparatus of claim 1, wherein the upper support plate is coupled to the vehicle body via a bolt.

8. An apparatus for coupling a shock absorber to a vehicle body, the apparatus comprising:
    an upper support plate defining a plurality of apertures, the upper support plate coupled to a body of the vehicle;
    a resilient member coupled to the upper support plate, the resilient member disposed substantially beneath the upper support plate, wherein the resilient member is adapted to protrude through the plurality of apertures to isolate the upper support plate from the vehicle body; and
    a shock absorber comprising a piston rod, the piston rod coupled to an underside of the upper support plate.

9. The apparatus of claim 8, wherein the resilient member is disposed to surround the piston rod of the shock absorber.

10. The apparatus of claim 8, wherein the resilient member comprises rubber.

11. The apparatus of claim 8 further comprising a coiled member disposed to surround the resilient member, the coiled member adapted to dampen vibrations in the body of the vehicle.

12. The apparatus of claim 8, wherein the upper support plate comprises metal.

13. The apparatus of claim 8, wherein the plurality of apertures are of a generally oval shape.

14. A vehicle suspension system comprising:
a vehicle body;
an upper support plate defining at least one aperture, the upper support plate coupled to the vehicle body; and
a resilient member coupled to an underside of the upper support plate, wherein at least one portion of the resilient member is adapted to protrude through the at least one aperture, wherein the at least one portion of the resilient member prevents direct contact between the upper support plate and the vehicle body.

15. The apparatus of claim 14, wherein the resilient member comprises rubber.

16. The apparatus of claim 14 further comprising a shock absorber coupled to the upper support plate, the shock absorber comprising a cylinder and a piston rod slidably disposed within the cylinder.

17. The apparatus of claim 16, wherein the resilient member is disposed to surround the piston rod.

18. The apparatus of claim 14 further comprising a coiled member disposed to surround the resilient member, the coiled member adapted to dampen vibrations in the body of the vehicle.

19. The apparatus of claim 14, wherein the upper support plate comprises metal.

20. The apparatus of claim 14, wherein the upper support plate is coupled to the vehicle body via a bolt.

* * * * *